United States Patent [19]
Kassner

[11] Patent Number: 5,548,353
[45] Date of Patent: Aug. 20, 1996

[54] OPHTHALMIC GLASS OF HIGH REFRACTIVE INDEX

[75] Inventor: Reinhard Kassner, Alfeld, Germany

[73] Assignee: Deutsche Spezialglas A.G., Grunenplan, Germany

[21] Appl. No.: 326,888

[22] Filed: Oct. 21, 1994

[30] Foreign Application Priority Data

Oct. 22, 1993 [DE] Germany ............ 43 36 122.6

[51] Int. Cl.$^6$ ..................... G02C 7/06
[52] U.S. Cl. ............ 351/168; 351/164; 351/172
[58] Field of Search ................ 351/172, 168, 351/164

[56] References Cited

U.S. PATENT DOCUMENTS

| | | | |
|---|---|---|---|
| 4,213,787 | 7/1980 | Faulstich et al. | 106/47 |
| 4,444,893 | 4/1984 | Mader et al. | 351/168 |
| 4,562,162 | 12/1985 | Sagara | 501/60 |
| 4,686,196 | 8/1987 | Gliemeroth et al. | 501/13 |
| 4,824,809 | 4/1989 | Grabowski et al. | 501/75 |
| 5,023,209 | 6/1991 | Grateau et al. | 501/13 |
| 5,034,354 | 7/1991 | Fine | 501/74 |
| 5,104,831 | 4/1992 | Behr et al. | 501/13 |
| 5,162,826 | 11/1992 | Morgan et al. | 351/164 |
| 5,190,896 | 3/1993 | Pucilowski et al. | 501/64 |
| 5,217,927 | 6/1993 | Behr et al. | 501/13 |

FOREIGN PATENT DOCUMENTS

| | | |
|---|---|---|
| 3008613 | 10/1990 | Germany . |
| 4101365 | 4/1992 | Germany . |
| 1089410 | 11/1967 | United Kingdom . |
| 2100715 | 1/1983 | United Kingdom . |
| 2251854 | 7/1992 | United Kingdom . |

*Primary Examiner*—Georgia Y. Epps
*Assistant Examiner*—Jordan M. Schwartz
*Attorney, Agent, or Firm*—Millen, White, Zelano, & Branigan, P.C.

[57] ABSTRACT

The invention relates to a glass of high refractive index suitable for the close-vision part of multifocal, in particular phototropic multifocal, spectacle lenses. The glass has a composition (in % by weight, based on oxide) of:

$SiO_2$ 28–40; $B_2O_3$ 0–8.5; $Li_2O$ 0–1; $Na_2O$ 0–2.5; $K_2O$ 0–5; CaO 0–6; SrO 0–6; BaO 6–12; ZnO 9–16; PbO 32–40; $TiO_2$ 0.3–7; $ZrO_2$ 0.3–5; Σ $Li_2O+Na_2O+K_2O$ 0–5, and a refractive index $n_e$ of 1.66–1.81, an expansion coefficient $\alpha_{20-300}$ of 5.7–6.8×10$^{-6}$ K$^{-1}$, a softening point of 650°–700° C. and a glass transition temperature Tg of 520°–560° C.

13 Claims, 1 Drawing Sheet

OPHTHALMIC GLASS OF HIGH REFRACTIVE INDEX

SUMMARY OF THE INVENTION

The invention relates to glasses of high refractive index, i.e., glasses with refractive indices $n_e$ of greater than 1.6, preferably 1.66 or greater. In particular, the invention relates to the production of glasses which are suitable as segments for multifocal photochromic spectacle lenses of high refractive index.

Multifocal photochromic spectacle lenses have been marketed since the mid-1970's. The photochromic glasses used for the majority of multifocal spectacle lenses originally had a refractive index of 1.523. The close-vision parts used for these glasses had refractive indices of between 1.58 and about 1.7.

However, it has been found that a photochromic glass of relatively high refractive index produces both cosmetic and weight improvements in spectacles, in particular in those with a high negative diopter number. The principal advantage of these glasses of relatively high refractive index is due to the fact that the thickness of the spectacle lens is reduced in the edge region. These high-index glasses generally have a refractive index of 1.6. In order to achieve comparable performance for the close-vision area, i.e., the reading distance, segment glasses of higher refractive index are required. These segment glasses of higher refractive index must naturally have all the other chemical and physical properties required of conventional segment glasses, for example, good chemical resistance, a thermal expansion coefficient matched to that of the principal glass, a viscosity behavior which enables good melting and shaping and good fusibility to the principal glass, etc.

In order to satisfy all demands on multifocal ophthalmic lenses over the entire range of lens prescriptions, a plurality of glasses covering a range of refractive indices is required. The refractive indices of close vision segments for spectacles having a principal part of 1.6 are generally between 1.66 and 1.81.

Glass compositions for photochromic lenses having a refractive index of 1.6 are described, for example, in U.S. Pat. No. 5,023,209 (date of filing: 13 Sep. 1990), U.S. Pat. No. 5,104,831 (date of filing: 25 Jul. 1989) and U.S. Pat. No. 5,217,927 (date of filing: 10 Oct. 1991).

A close-vision segment glass for a multifocal photochromic spectacle lens of high refractive index is described, for example, in U.S. Pat. No. 5,162,826. This glass has a composition (in % by weight, based on oxide) of: $SiO_2$ 24–42; $Al_2O_3$ 3–7.5; $B_2O_3$ 2–7.5; PbO 35–57; $Li_2O$ 0–2; $Na_2O$ 0–2; $K_2O$ 0–3; $Li_2O+Na_2O+K_2O$ 0–3.5; $La_2O_6$ 1–8; $ZrO_2$ 0–2.5; $TiO_2$ 0–8; $La_2O_3+ZrO_2+TiO_2$ 4–12. This glass has a refractive index of between about 1.66 and 1.81, an Abbe number of about 28–34 and a thermal expansion coefficient of from about 5.3 to $6.5 \times 10^{-6°}$ $C.^{-1}$ in the range from 25° C. to 300° C.

U.S. Pat. No. 4,824,809 relates to glasses having refractive indices of between 1.73 and 1.78. These glasses comprise, in % by weight: $SiO_2$ 12–20; $B_2O_3$ 10–18; PbO 50–60; $ZrO_2$ 0.5–3; $La_2O_3$ 2–10; $Cs_2O$ 0–5; $Al_2O_3$ 2–7; ZnO 0–4; $TiO_2$ 0–5; $Na_2O+K_2O+Li_2O$ 0–1.

An object of the invention is to find a glass of high refractive index which can be used as the close-vision part in multifocal photochromic spectacle lenses of high refractive index, wherein the refractive index of the glass for the close-vision part can be varied over a broad range of about 1.66–1.81 by varying the composition of the glass.

Upon further study of the specification and appended claims, further objects and advantages of this invention will become apparent to those skilled in the art.

These objects are achieved by a glass composition containing (in % by weight, based on oxide): 28–40 $SiO_2$; 0–8.5 $B_2O_3$; 0–1 $Li_2O$; 0–2.5 $Na_2O$; 0–5 $K_2O$; 0–5 $\Sigma$ $Li_{O+Na_2}O+K_2O$; 0–6 CaO; 0–6 SrO; 6–12 BaO; 9–16 ZnO; 32–40 PbO; 0.3–7 $TiO_2$; 0.3–5 $ZrO_2$. This glass composition can be used to form the close-vision part of a multifocal spectacle lens.

The glasses based on this composition have refractive indices of about 1.66–1.81, softening points of about 650°–700° C., glass transition temperatures Tg of about 520°–560° C. and a linear thermal expansion coefficient of about $5.7$–$6.8 \times 10^{-6}$ $K^{-1}$ in the 25° C.–300° C. range. Owing to these thermal properties, they are very readily fusible to the known high-index glasses for the distance-vision part of a photochromic multifocal spectacle lens, as described, for example, in U.S. Pat. No. 5,104,831 and U.S. Pat. No. 5,217,927. These high-index glasses for the distance-vision part have a glass transition temperature of approximately 530° C., a linear softening point of about 690° C. and a thermal expansion coefficient $\alpha$ of about $6 \times 10^{-6}$ $K^{-1}$ in the range from 20°–300° C.

$SiO_2$ as the major constituent of the glass according to the invention, in terms of the number of moles, is principally responsible for the good chemical resistance and the crystallization stability of the glass. A proportion by weight of less than 28% results not only in lower chemical resistance and crystallization stability, but also considerably impairs the relative partial dispersion. A proportion by weight of greater than 40% means that glasses having the high refractive index desired frequently cannot be obtained. Thus, the $SiO_2$ content of the glass is about 28–40%, e.g., 28, 29, 30, 31, 32, 33, 34, 35, 36, 37, 38, 39 or 40%.

$B_2O_3$ has a positive effect on the melting behavior and the relative partial dispersion, but need not necessarily be present in the glass. However, a proportion of 8.5% by weight of $B_2O_3$ should not be exceeded, since the danger then exists that the resistance, in particular to acids, becomes too low. Suitable $B_2O_3$ contents include 1, 2, 3, 4, 5, 6, 7 and 8%.

Lithium oxide, sodium oxide and potassium oxide improve the melting of the batch during glassmaking, and also, even in very small amounts, have a considerable effect on the viscosity and thermal expansion of the glass. $Li_2O$ should be present in the glass in maximum amounts of up to 1% by weight, since higher amounts entail the risk of devitrification. The maximum amount of the other alkali metal oxides $Na_2O$ and $K_2O$ should not exceed 2.5 and 5% by weight, respectively. The total amount of $Li_2O+Na_2O+K_2O$ must not exceed 5% by weight owing to the above-mentioned risk of devitrification. Suitable $Li_2O+Na_2O+K_2O$ contents include 1, 2, 3 and 4%.

The alkaline earth metal oxides calcium oxide, strontium oxide and barium oxide serve primarily to increase the refractive index. Barium oxide has proved more suitable than calcium oxide and strontium oxide for increasing the refractive index owing to its effect on the viscosity behavior and on the chemical resistance of the glass. The proportion of barium oxide should therefore be about 6–12%, e.g., 7, 8, 9, 10 or 11%. On the other hand, the maximum amount of calcium oxide and strontium oxide is 6% by weight, in each case, for example, 1, 2, 3, 4 or 5%. The total amount of calcium oxide and strontium oxide preferably does not exceed 6% by weight.

Zinc oxide has a considerably effect on the thermal expansion of the glass and serves only secondarily to increase the refractive index. It should be present in the glass in a proportion of about 9–16% by weight. Suitable ZnO contents include 10, 11, 12, 13, 14 and 15%.

Lead oxide (PbO) is more important for the achievement of a high refractive index of the glass and has a positive effect on the viscosity in the melting and fusing region. It is present in the glass in amounts of about 32–40% by weight, for example, 33, 34, 35, 36, 37, 38 or 39%. However, the disadvantage of a high lead-oxide content is a high density and a high partial dispersion, so that a proportion of significantly greater than 40% by weight of PbO is undesired.

Titanium dioxide and zirconium dioxide considerably increase the refractive index and significantly improve the chemical resistance of the glass. They are present in the glass in amounts of about 0.3–7% by weight and about 0.3–5% by weight, respectively. Contents of greater than 7% by weight of $TiO_2$ and greater than 5% by weight of $ZrO_2$ can result in significant melting and crystallization problems.

The glass may furthermore, if desired, contain conventional refining auxiliaries, for example, $As_2O_3$, $Sb_2O_3$ or $CeO_2$, the first two being preferred and being present in the glass in amounts of preferably not more than about 0.5% by weight, in particular not more than 0.3% by weight. In the case of refining by means of $CeO_2$, slightly larger amounts are necessary, as is known, but the content of $CeO_2$ in the glass should not exceed about 0.7% by weight. Refining by means of $CeO_2$ produces a yellow tint in the glass; such refining is, therefore, only carried out if such a yellow tint is desired.

If basic coloring of the glass is desired, a small amount of coloring oxides may also be present in the glass in a manner known per se, generally in amounts of not more than up to a total of 1.5% by weight. Particularly suitable are, for example, one or more of the following: up to 1% by weight of $Er_2O_3$, up to 1% by weight $Nd_2O_3$, up to 0.1% by weight of CoO, up to 0.3% by weight of NiO or up to 0.3% by weight, e.g., up to 0.1 wt. %, of $Cr_2O_3$.

Owing to its good optical and physical properties, the glass according to the invention is particularly suitable for a multifocal spectacle lens. In accordance with the invention, the multifocal spectacle lens comprises a relatively large segment (distance-vision part) and a smaller segment, fused thereto, of glass of high refractive index (close-vision part), where the relatively large segment (the distance-vision part) is produced from a photochromic glass which has a refractive index of approximately 1.6, a softening point of approximately 690° C., a glass transition temperature Tg of about 530° C. and a linear thermal expansion coefficient α of about $6.0 \times 10^{-6}$ $K^{-1}$ in the range from 20° to 300° C., and where the segment of high refractive index (close-vision part) is produced from the glass according to the invention having a refractive index $n_e$ of approximately 1.66–1.81, a softening point of approximately 650°–700° C., preferably 660°–700° C., a glass transition temperature Tg of about 520°–560° C. and a linear thermal expansion coefficient α (20°–300° C.) of about $5.7–6.8 \times 10^{-6}$ $K^{-1}$.

The production of multifocal spectacle lenses is well known in the art. A typical process is as follows: (a) into the preshaped distance-vision part a depression is grinded and polished, the grinded curve of the depression depends on the prescription of the close-vision part; (b) the close-vision part is welded (sintered together) with a so-called supplementary part, which is of the material of the distance-vision part; (c) the ensemble of the close-vision and the supplementary part are grinded and polished on the side pointing to the depression, the grinded curve is adapted to the depression in the distance-vision-part; (d) the close-vision part is laid into the depression of the distance-vision part and the two parts are melted together in a furnace; and (e) the completed lens is grinded and polished.

DETAILED DESCRIPTION OF THE DRAWINGS

Figure 1A:
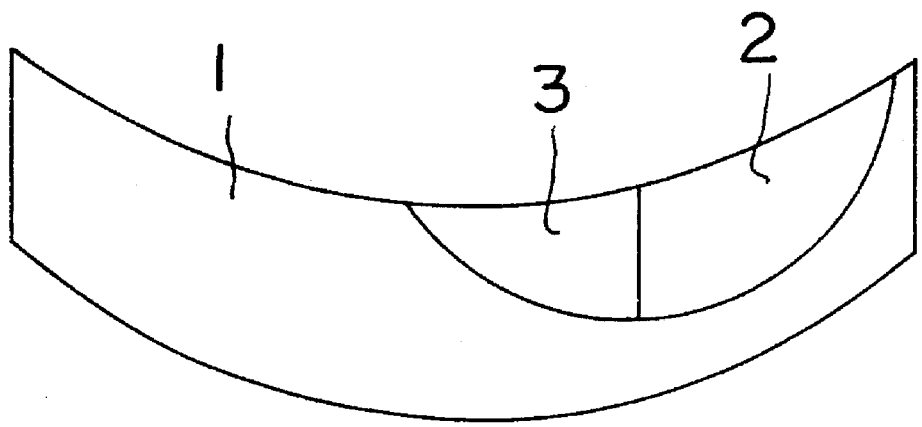
FIG. 1A and 1B illustrate multifocal spectacle lenses.
Figure 1B:
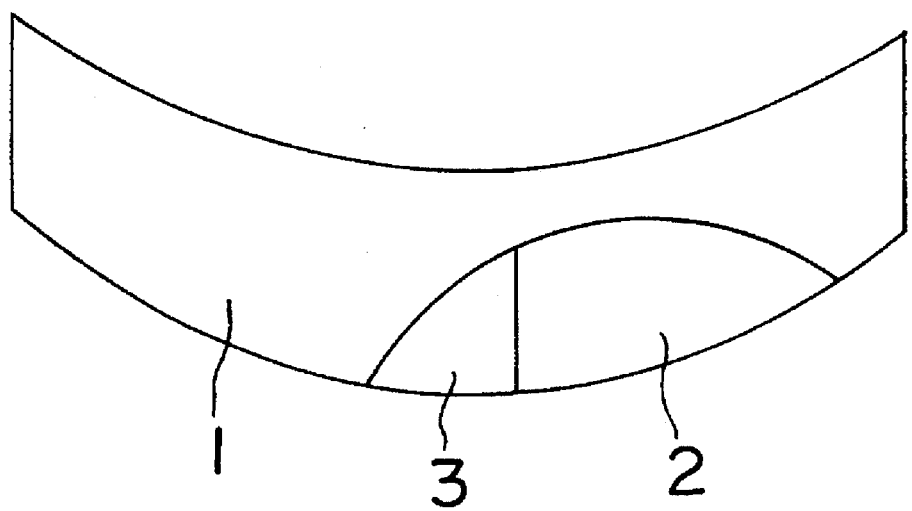

FIG. 1A illustrates a multifocal spectacle lens prepared by internal fusion as depicted in a pre-fusion state. In this multifocal lens, the distant-vision part 1 has a depression formed on its internal or concave side. Positioned within this depression is the close-vision part 2 and the so-called supplementary part 3. FIG. 1B also illustrates a multifocal spectacle lens. In this case, the depression in the distant-vision part 1 is formed on the external or convex side.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 43 36 122.6, filed Oct. 22, 1993, are hereby incorporated by reference.

EXAMPLES

The following table shows examples of novel glasses in % by weight, based on oxide. The batches were melted in a manner known per se at about 1350° C. in a platinum crucible from conventional glass raw materials.

In the table, $n_e$ and $v_e$ denote the refractive indices and Abbe numbers, respectively, measured at the corresponding wavelengths; Tg stands for glass transition temperature; $\alpha_{20-300}$ is the linear thermal expansion coefficient at 20°–300° C.; ρ represents density; SP means softening point; and $Sb_2O_3/As_2O_3$ represents $Sb_2O_3$, $As_2O_3$, or combinations thereof.

| Example | 1 | 2 | 3 | 4 | 5 | 6 | 7 | 8 | 9 | 10 | 11 | 12 |
|---|---|---|---|---|---|---|---|---|---|---|---|---|
| $SiO_2$ | 33.5 | 38.4 | 38.6 | 29.1 | 36.0 | 35.4 | 32.5 | 32.5 | 31.0 | 28.5 | 31.5 | 32.0 |
| $B_2O_3$ | 5.3 | | | 7.0 | | | | 2.4 | 3.3 | | | |
| $Li_2O$ | 0.4 | 0.8 | 0.7 | 0.4 | 0.8 | 0.7 | 0.8 | 0.8 | 0.3 | 0.4 | 0.7 | |
| CaO | | | | 4.0 | | | 4.8 | | 5.3 | | | |

-continued

| Example | 1 | 2 | 3 | 4 | 5 | 6 | 7 | 8 | 9 | 10 | 11 | 12 |
|---|---|---|---|---|---|---|---|---|---|---|---|---|
| SrO | | | | | | | | 4.7 | | | | |
| BaO | 12.0 | 10.0 | 10.5 | 8.0 | 9.5 | 8.9 | 8.8 | 8.9 | 8.8 | 9.0 | 8.9 | 8.9 |
| ZnO | 13.0 | 12.8 | 12.5 | 11.0 | 11.0 | 11.0 | 10.0 | 10.0 | 10.0 | 15.5 | 14.8 | 9.5 |
| PbO | 33.5 | 35.8 | 35.5 | 26.5 | 35.5 | 37.6 | 35.1 | 35.1 | 35.2 | 35.8 | 35.1 | 38.5 |
| $TiO_2$ | 0.5 | 0.5 | 0.5 | 3.1 | 5.1 | 4.4 | 2.8 | 2.8 | 2.8 | 4.0 | 5.9 | 6.9 |
| $ZrO_2$ | 0.8 | 0.7 | 0.7 | 6.0 | 2.0 | 2.0 | 4.9 | 4.9 | 4.0 | 5.0 | 2.9 | 4.0 |
| $Sb_2O_3/As_2O_3$ | 0.3 | 0.3 | 0.3 | 0.1 | 0.1 | 0.1 | 0.3 | 0.3 | 0.3 | 0.3 | 0.3 | 0.3 |
| $n_e$ | 1.68668 | 1.68717 | 1.68586 | 1.73965 | 1.73794 | 1.73868 | 1.75936 | 1.75417 | 1.75179 | 1.77477 | 1.78039 | 1.79658 |
| $\nu_3$ | 37.3 | 36.3 | 36.3 | 35.4 | 31.6 | 31.5 | 32.6 | 32.5 | 33.1 | 31.0 | 29.8 | 28.1 |
| $\rho$ (g/cm³) | 4.08 | 4.10 | 4.10 | 4.08 | 4.18 | 4.24 | 4.32 | 4.38 | 4.27 | 4.44 | 4.41 | 4.46 |
| $\alpha_{20-300} \cdot 10^{-6}$ K$^{-1}$ | 6.13 | 6.06 | 6.05 | 6.31 | 5.87 | 6.07 | 6.80 | 6.76 | 6.40 | 6.10 | 6.02 | 6.13 |
| Tg (°C.) | 520 | 522 | 530 | 563 | 528 | 542 | 555 | 551 | 557 | 537 | 555 | 552 |
| SP (°C.) | 654 | 675 | 680 | 693 | 682 | 679 | 697 | 696 | 696 | 662 | 676 | 680 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A multifocal spectacle lens comprising a relatively large segment (distance-vision part) and a smaller segment, fused thereto, of a glass of high refractive index (close-vision part), wherein the close-vision part has a refractive index $n_e$ of 1.66–1.81, a linear thermal expansion coefficient $\alpha_{20-300}$ of 5.7–6.8×10$^{-6}$ K$^{-1}$, a softening point of 650° C.–700° C., and a glass transition temperature, Tg, of 520° C.–560° C., and wherein said close-vision part is a glass composition comprising (in % by weight, based on oxide):

| | |
|---|---|
| $SiO_2$ | 28–40 |
| $B_2O_3$ | 0–8.5 |
| $Li_2O$ | 0–1 |
| $Na_2O$ | 0–2.5 |
| $K_2O$ | 0–5 |
| $\Sigma$ $Li_2O$ + $Na_2O$ + $K_2O$ | 0–5 |
| CaO | 0–6 |
| SrO | 0–6 |
| BaO | 6–12 |
| ZnO | 9–16 |
| PbO | 32–40 |
| $TiO_2$ | 0.3–7 |
| $ZrO_2$ | 0.3–5. |

2. A multifocal spectacle lens according to claim 1, wherein the distance-vision part comprises a photochromic glass which has a refractive index $n_e$ of approximately 1.6, a softening point of approximately 690° C., a glass transition temperature Tg of approximately 530° C. and a linear thermal expansion coefficient $\alpha_{20-300}$ of about 6.0×10$^{-6}$ K$^{-1}$.

3. A multifocal spectacle lens according to claim 1, wherein said glass composition contains up to 0.5% $As_2O_3$.

4. A multifocal spectacle lens according to claim 1, wherein said glass composition contains up to 0.5% $Sb_2O_3$.

5. A multifocal spectacle lens according to claim 1, wherein said glass composition contains up to 0.7% $CeO_2$.

6. A multifocal spectacle lens according to claim 1, wherein said glass composition contains up to a total of 1.5 wt. % coloring oxides.

7. A multifocal spectacle lens according to claim 6, wherein said coloring oxides are selected from $E_2O_3$, $Nd_2O_3$, CoO, NiO, $Cr_2O_3$ and combinations thereof.

8. A multifocal spectacle lens according to claim 6, wherein said glass composition contains as coloring oxides up to 1 wt. % $Er_2O_3$ or up to 1 wt. % $Nd_2O_3$.

9. A multifocal spectacle lens according to claim 6, wherein said glass composition contains as coloring oxides up to 0.1 wt. % CoO, up to 0.3 wt. % NiO, or up to 0.1 wt. % $Cr_2O_3$.

10. A multifocal spectacle lens according to claim 1, wherein the glass of said close-vision part has a softening point of 660°–700° C.

11. A multifocal spectacle lens according to claim 1, wherein said glass composition has an Abbe number of at least 28.1.

12. A multifocal spectacle lens according to claim 1, wherein said glass composition has a density of $\leq 4.46$ g/cm³.

13. A multifocal spectacle lens comprising a relatively large segment (distance-vision part) and a smaller segment, fused thereto, of a glass of high refractive index (close-vision part), wherein the close-vision part has a refractive index $n_e$ of about 1.66–1.81, a linear thermal expansion coefficient $\alpha_{20-300}$ of about 5.7–6.8×10$^{-6}$ K$^{-1}$, a softening point of 650° C.–700° C., and a glass transition temperature, Tg, of about 520° C.–560° C. and wherein said close-vision part is a glass composition comprising (in % by weight, based on oxide):

| | |
|---|---|
| $SiO_2$ | 28–40 |
| $B_2O_3$ | 0–8.5 |
| $Li_2O$ | 0–1 |
| $Na_2O$ | 0–2.5 |
| $K_2O$ | 0–5 |
| $\Sigma$ $Li_2O$ + $Na_2O$ + $K_2O$ | 0–5 |
| CaO | 0–6 |
| SrO | 0–6 |
| BaO | 6–12 |
| ZnO | 9–16 |
| PbO | 32–40 |
| $TiO_2$ | 0.3–7 |
| $ZrO_2$ | 0.3–5. |

* * * * *